(12) United States Patent
Hsieh

(10) Patent No.: US 8,287,170 B2
(45) Date of Patent: Oct. 16, 2012

(54) DISPLAY SCREEN WINDOW ASSEMBLY

(75) Inventor: Hsing-Yuan Hsieh, Taipei Hsien (TW)

(73) Assignee: FIH (Hong Kong) Limited, Kowloon (HK)

( * ) Notice: Subject to any disclaimer, the term of this patent is extended or adjusted under 35 U.S.C. 154(b) by 709 days.

(21) Appl. No.: 12/549,178

(22) Filed: Aug. 27, 2009

(65) Prior Publication Data

US 2010/0148695 A1 Jun. 17, 2010

(30) Foreign Application Priority Data

Dec. 17, 2008 (CN) .......................... 2008 1 0306321

(51) Int. Cl.
*F21V 7/04* (2006.01)
(52) U.S. Cl. ............................ 362/612; 455/66; 362/97.3
(58) Field of Classification Search ................... 362/600, 362/612, 97.3; 313/461, 473; 445/23, 24, 445/66
See application file for complete search history.

(56) References Cited

U.S. PATENT DOCUMENTS 6,890,656 B2 * 5/2005 Iacovangelo et al. ......... 428/412
8,002,442 B2 * 8/2011 Mehrtens et al. ............. 362/293

FOREIGN PATENT DOCUMENTS

| CN | 2684310 Y | 3/2005 |
| CN | 1866342 A | 11/2006 |
| CN | 1942067 A | 4/2007 |

* cited by examiner

*Primary Examiner* — Thuy Vinh Tran
(74) *Attorney, Agent, or Firm* — Altis Law Group, Inc.

(57) ABSTRACT

A display screen window assembly includes a display screen window and a photo catalyst layer. The display screen window has an outer surface. The photo catalyst layer is disposed on the outer surface of the display screen window, thus the outer surface of the display window assembly has hydrophilic and decomposing functions. The photo catalyst layer may set off chemical reaction with the water molecule and oxygen molecule under emission of light to prevent the water and foreign materials from forming on or sticking to the outer surface of the display screen window.

15 Claims, 4 Drawing Sheets

DISPLAY SCREEN WINDOW ASSEMBLY

BACKGROUND

1. Technical Field

The exemplary disclosure generally relates to display screen window assemblies, and particularly, to a display screen window assembly with decontaminating and disinfecting functions.

2. Description of Related Art

With the development of wireless communication and information processing technologies, portable electronic devices such as mobile phones and personal digital assistants (PDAs) are now in widespread use, and consumers may now enjoy the full convenience of high technology products almost anytime and anywhere.

A conventional portable electronic device generally includes a display screen and a display screen window assembled in front of the display screen for protecting the display screen. The conventional display screen window is made of transparent plexiglass, transparent plastic material, etc. However, the outer surface of the display screen window is often covered with sweat, grime, oil stain, fingerprints, dust, bacteria, etc. As a result, the user may not see the information shown on the display screen clearly and, the bacteria may grow on the outer surface of the display screen.

Therefore, there is room for improvement within the art.

BRIEF DESCRIPTION OF THE DRAWINGS

Many aspects of the display screen window assembly can be better understood with reference to the following drawings. These drawings are not necessarily drawn to scale, the emphasis instead being placed upon clearly illustrating the principles of the present display screen window assembly. Moreover, in the drawings like reference numerals designate corresponding sections throughout the several views.

DETAILED DESCRIPTION

The present display screen window assembly is suitable for using in portable electronic devices, e.g., mobile phones, personal digital assistants (PDAs), digital cameras, etc. to protect the display screens thereof.

Figure 1:
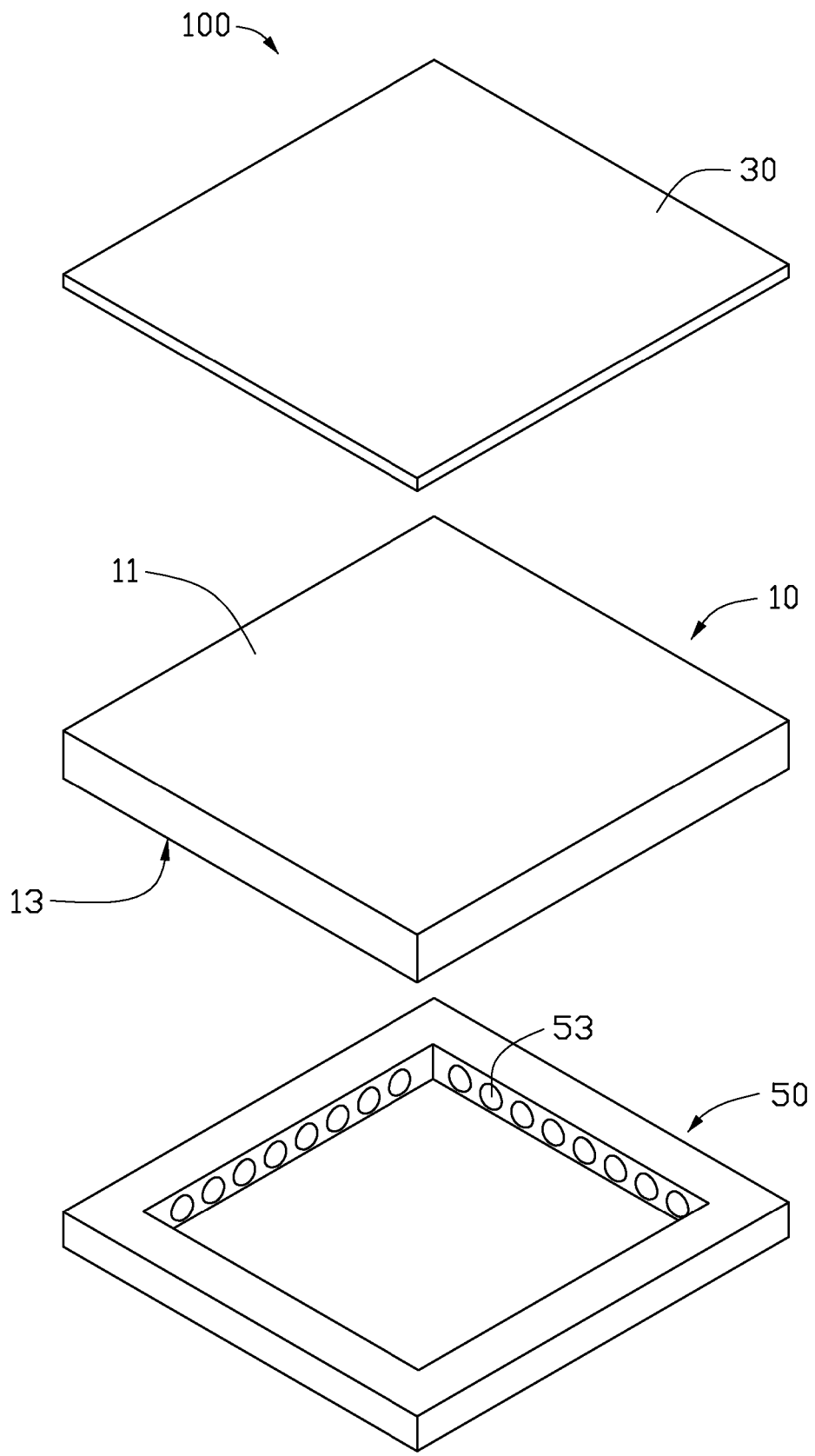
FIG. 1 shows an exploded, perspective view of a display screen window assembly, in accordance with an exemplary embodiment.
Figure 2:
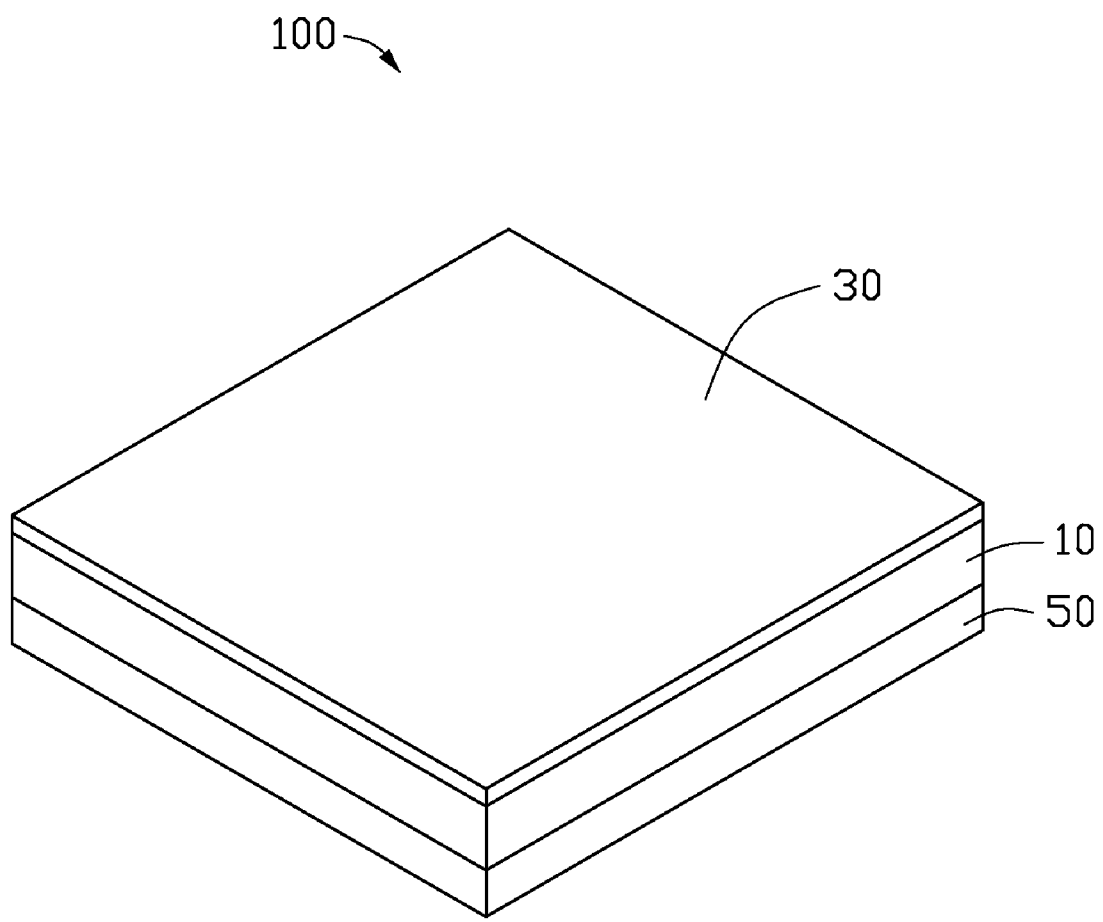
FIG. 2 shows a perspective view of a display screen window assembly, in accordance with an exemplary embodiment.

Referring to FIG. 1 and FIG. 2, the display screen window assembly 100 includes a display screen window 10, a photo catalyst layer 30, and an ultraviolet light supply apparatus 50. The display screen window 10 is made of transparent material such as glass, polycarbonate, plastic material, etc. The display screen window 10 is assembled in front of the display screen (not shown) of the portable electronic device to protect the display screen. The display screen window 10 includes an outer surface 11 and an opposite assembling surface 13.

The photo catalyst layer 30 is a membranous layer made of $TiO_2$ and is disposed on the outer surface 11 of the display screen window 10 by sputtering technology, coating technology, etc. The photo catalyst layer 30 may set off chemical reactions with the foreign materials such as water molecules, oxygen molecules, etc. when subjected to light from sunlight, daylight lamp, ultraviolet light, etc. to form hydrogen ions ($H^+$), hydroxide ions ($OH^-$) and oxygen free radicals. The formed hydrogen ion ($H^+$), hydroxide ion ($OH^-$) can prevent water from sticking to the outer surface 11 of the display screen window 10. Thus, the outer surface 11 of the display screen window 10 becomes hydrophilic. The formed oxygen free radicals have strong oxidative and reductive ability and can decompose or degrade bacteria and dirt, etc. formed on the outer surface 11 of the display screen window 10 quickly and efficiently. In the present embodiment, the wavelength of the ultraviolet light is preferably chosen from about 360 nm to about 400 nm.

The ultraviolet light supply apparatus 50 can be an integrated circuit model, mounted on the assembling surface 13 of the display screen window 10 to provide ultraviolet light. In the present embodiment, the ultraviolet light supply apparatus 50 is a frame and includes a plurality of light-emitting diode (LED) lamps 53 disposed thereon for producing ultraviolet light. The ultraviolet light supply apparatus 50 is mounted on the periphery of the assembling surface 13 of the display screen window 10 and electrically connects with the components such as battery, circuit board, etc. within the portable electronic device (not shown).

Figure 3:
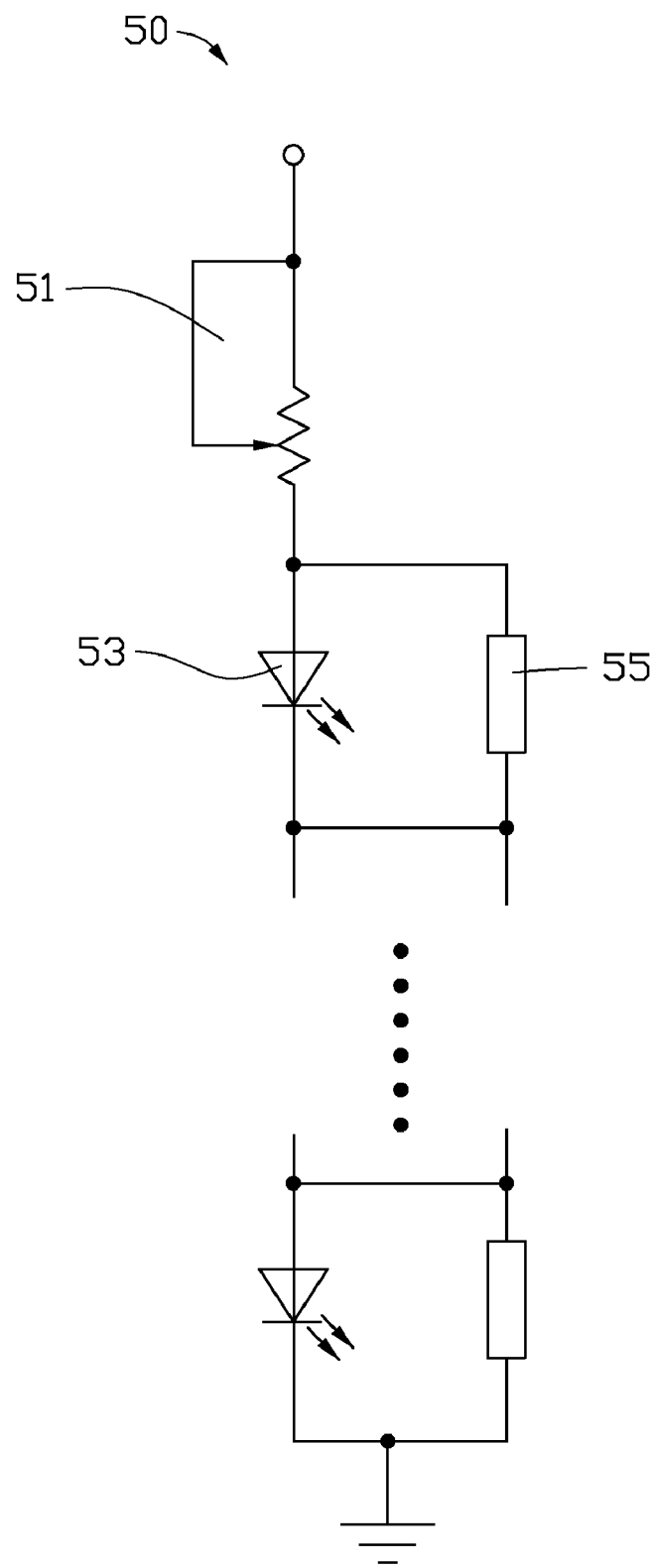
FIG. 3 shows a controlling circuit of the ultraviolet light supply apparatus of the display screen window assembly, in accordance with an exemplary embodiment.

FIG. 3 shows a controlling circuit of the ultraviolet light supply apparatus 50 of the display screen window assembly 100, in accordance with an exemplary embodiment. The ultraviolet light supply apparatus 50 includes an adjusting device 51, a plurality of light-emitting diode lamps 53 and a plurality of conventional electro static discharge protecting components 55. The adjusting device 51 electrically connects with the circuit board assembled within the portable electronic device and is used to control and adjust the light-emitting diode lamps 53 to achieve different light intensity. In the present embodiment, the adjusting device 51 is a slide rheostat connecting in series with the light-emitting diode lamps 53. The electro static discharge protecting components 55 connect in parallel with the corresponding light-emitting diode lamps 53 respectively.

Figure 4:
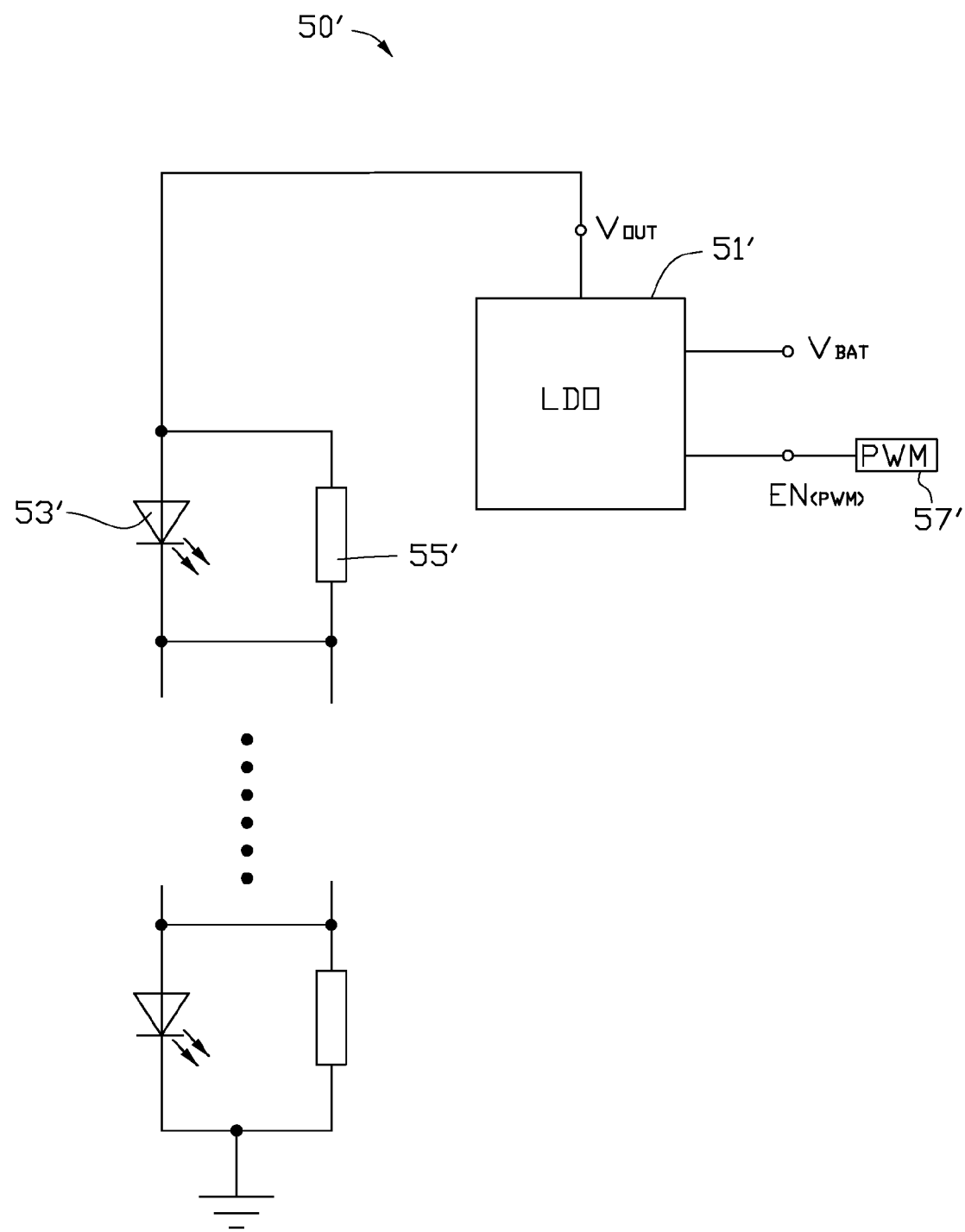
FIG. 4 shows a controlling circuit of the ultraviolet light supply apparatus of the display screen window assembly, in accordance with another exemplary embodiment.

FIG. 4 shows a controlling circuit of the ultraviolet light supply apparatus 50' of the display screen window assembly 100, in accordance with another exemplary embodiment. The controlling circuit of the ultraviolet light supply apparatus 50' is similar to the controlling circuit of the ultraviolet light supply apparatus 50 shown in FIG. 3. The ultraviolet light supply apparatus 50' includes a low dropout regulator (LDO) 51', a plurality of light-emitting diode lamps 53', a plurality of conventional electro static discharge protecting components 55' and a pulse width modulator (PWM) 57'. The low dropout regulator 51' includes a power voltage input pin $V_{BAT}$, a voltage output pin $V_{OUT}$, and a pulse width modulator access pin $EN_{PWM}$. The power voltage input pin $V_{BAT}$ of the low dropout regulator 51' electrically connects with the circuit board of the portable electronic device to get an input voltage. The voltage output pin $V_{OUT}$ of the low dropout regulator 51' connects in series with the light-emitting diode lamps 53'. The plurality of the electro static discharge protecting components 55' connect in parallel with the corresponding light-emitting diode lamps 53' respectively. The pulse width modulator access pin $EN_{PWM}$ of the low dropout regulator 51' electrically connects with the pulse width modulator 57' for adjusting the output voltage of the voltage output pin $V_{OUT}$ of the low dropout regulator 51' to adjust the light-emitting diode lamps 53'.

It is to be understood that the ultraviolet light supply apparatus 50 and the display screen window 10 can be produced with one forming mold method.

It is to be understood, however, that even through numerous characteristics and advantages have been set forth in the foregoing description of embodiments, together with details of the structure and functions of the embodiments, the disclosure is illustrative only, and changes may be made in detail, especially in matters of shape, size, and arrangement of sections within the principles of the disclosure to the full extent indicated by the broad general meaning of the terms, in which the appended claims are expressed.

What is claimed is:

1. A display screen window assembly used in a portable electronic device, comprising:
   a display screen window having an outer surface; and
   a photo catalyst layer disposed on the outer surface of the display screen window thereby providing the outer surface of the display window assembly hydrophilic and decomposing functions.

2. The display screen window assembly as claimed in claim 1, wherein the photo catalyst layer is a membranous layer made of $TiO_2$ and the photo catalyst layer sets off chemical reactions with foreign materials attached thereto under emission of light to form hydrogen ions, hydroxide ions and oxygen free radicals.

3. The display screen window assembly as claimed in claim 2, wherein the photo catalyst layer is disposed on the outer surface of the display screen window by sputtering technology or coating technology.

4. The display screen window assembly as claimed in claim 2, wherein the display screen window further includes an assembling surface opposite the outer surface; the display screen widow assembly further includes an ultraviolet light supply apparatus mounted on the assembling surface of the display screen window to provide the ultraviolet light.

5. The display screen window assembly as claimed in claim 4, wherein the ultraviolet light supply apparatus is an integrated circuit model, comprising a plurality of light-emitting diode lamps for producing ultra-violet light.

6. The display screen window assembly as claimed in claim 5, wherein the ultraviolet light supply apparatus further includes an adjusting device electrically connecting with a circuit board of the portable electronic device to control and adjust the light-emitting diode lamps to achieve different light intensities.

7. The display screen window assembly as claimed in claim 6, wherein the adjusting device is a slide rheostat connected in series with the light-emitting diode lamps.

8. The display screen window assembly as claimed in claim 7, wherein the ultraviolet light supply apparatus further includes a plurality of electro static discharge protecting components connecting in parallel with the corresponding light-emitting diode lamps respectively.

9. The display screen window assembly as claimed in claim 4, wherein the ultraviolet light supply apparatus includes a low dropout regulator, a plurality of light-emitting diode lamps, and a pulse width modulator; the low dropout regulator includes a power voltage input pin $V_{BAT}$ electrically connecting with a circuit board of the portable electronic device to get an input voltage, a voltage output pin $V_{OUT}$ connecting in series with the light-emitting diode lamps, and a pulse width modulator access pin $EN_{PWM}$ electrically connecting with the pulse width modulator for adjusting the output voltage of the voltage output pin $V_{OUT}$ of the low dropout regulator to adjust the light-emitting diode lamps.

10. The display screen window assembly as claimed in claim 9, wherein the ultraviolet light supply apparatus further includes a plurality of electro static discharge protecting components connected in parallel with the corresponding light-emitting diode lamps respectively.

11. The display screen window assembly as claimed in claim 9, wherein the display screen window is made of transparent material, the ultraviolet light supply apparatus and the display screen window are produced with one forming mold method.

12. A display screen window assembly used in a portable electronic device, comprising:
   a display screen window having an outer surface and an assembling surface opposite to the outer surface;
   a photo catalyst layer disposed on the outer surface of the display screen window; and
   an ultraviolet light supply apparatus mounted on the assembling surface of the display screen window to provide the ultraviolet light to the photo catalyst layer.

13. The display screen window assembly as claimed in claim 12, wherein the photo catalyst layer is a membranous layer of $TiO_2$ disposed on the outer surface of the display screen window.

14. The display screen window assembly as claimed in claim 13, wherein the ultraviolet light supply apparatus further includes an adjusting device electrically connecting with a circuit board of the portable electronic device to control and adjust the light-emitting diode lamps to achieve different light intensities.

15. The display screen window assembly as claimed in claim 13, wherein the ultraviolet light supply apparatus includes a low dropout regulator, a plurality of light-emitting diode lamps, and a pulse width modulator; the low dropout regulator includes a power voltage input pin ($V_{BAT}$) electrically connecting with a circuit board of the portable electronic device to get an input voltage, a voltage output pin ($V_{OUT}$) connecting in series with the light-emitting diode lamps, and a pulse width modulator access pin ($EN_{PWM}$) electrically connecting with the pulse width modulator for adjusting the output voltage of the voltage output pin ($V_{OUT}$) of the low dropout regulator to adjust the light-emitting diode lamps.

* * * * *